United States Patent [19]

Schaefer et al.

[11] 4,240,812
[45] Dec. 23, 1980

[54] VACUUM CLEANER BAG ASSEMBLY

[75] Inventors: Harold W. Schaefer, Bloomington; Joyce K. Thomas; Samuel E. Hohulin, both of Lexington, all of Ill.

[73] Assignee: National Union Electric Corporation, Greenwich, Conn.

[21] Appl. No.: 55,617

[22] Filed: Jul. 9, 1979

Related U.S. Application Data

[62] Division of Ser. No. 857,094, Dec. 5, 1977.

[51] Int. Cl.$^3$ .............................................. B01D 46/02
[52] U.S. Cl. ......................................... 55/369; 55/381; 55/371; 44/473; 229/53; 150/7
[58] Field of Search ................. 55/361, 364, 370, 369, 55/371, 378, 380, 381, 473; 15/351; 229/53, 56, 72; 150/7

[56] References Cited

U.S. PATENT DOCUMENTS

| 1,555,058 | 10/1915 | Hogue | 150/1 |
| 1,832,457 | 11/1931 | Gilbert | 15/323 |
| 1,953,189 | 4/1934 | Orr | 55/378 |
| 2,003,720 | 6/1935 | Meek | 55/370 |
| 2,317,569 | 4/1943 | Weaver | 55/378 |
| 2,747,216 | 5/1956 | Tschudy | 15/351 |
| 3,462,069 | 8/1969 | Suominen | 229/72 |
| 3,535,855 | 10/1970 | Howard et al. | 55/382 |
| 3,971,643 | 7/1976 | Hufton | 55/380 |

Primary Examiner—Bernard Nozick
Attorney, Agent, or Firm—Alfred E. Miller

[57] ABSTRACT

A vacuum cleaner has an elongated porous outer bag for holding a filter bag over an air outlet. A hanger within the outer bag is positioned to suspend the outer bag from the vacuum cleaner, as well as to hold a pocket within the outer bag, so that spare filter bags may be held within the porous outer bag and an end flap extending into the outer bag.

3 Claims, 9 Drawing Figures

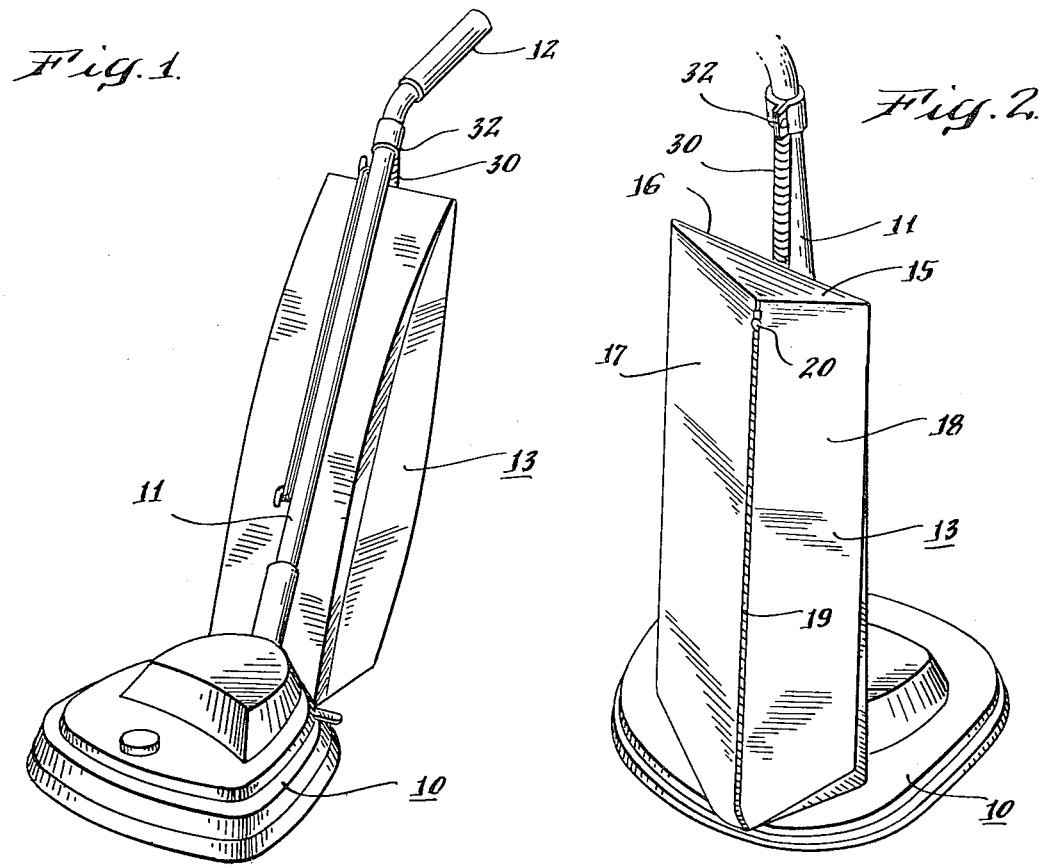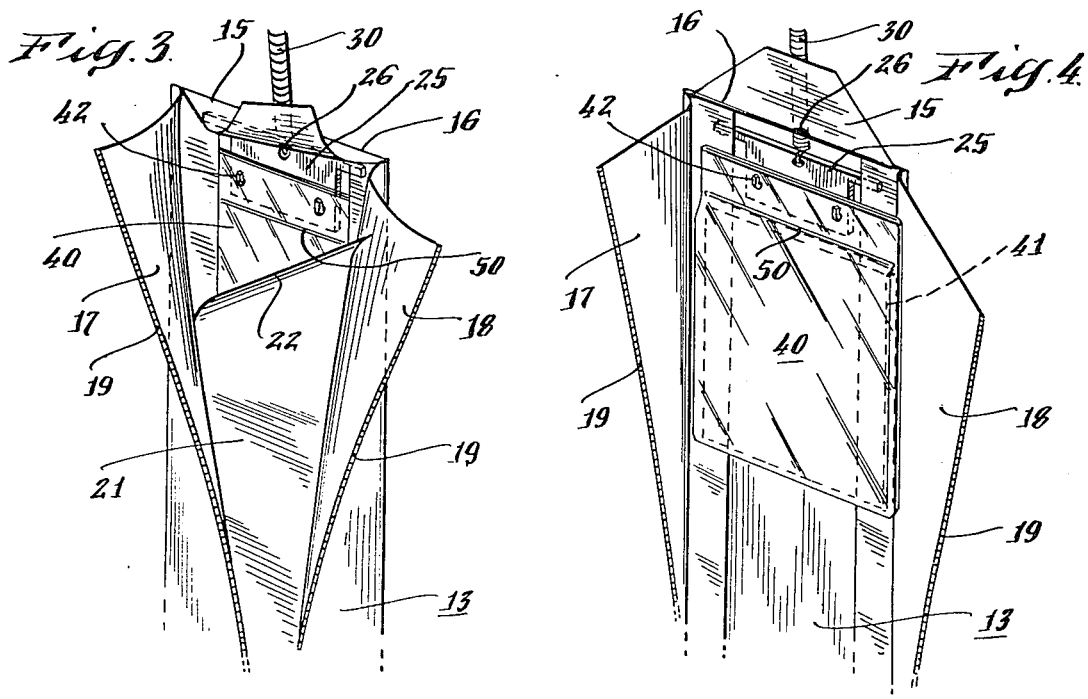

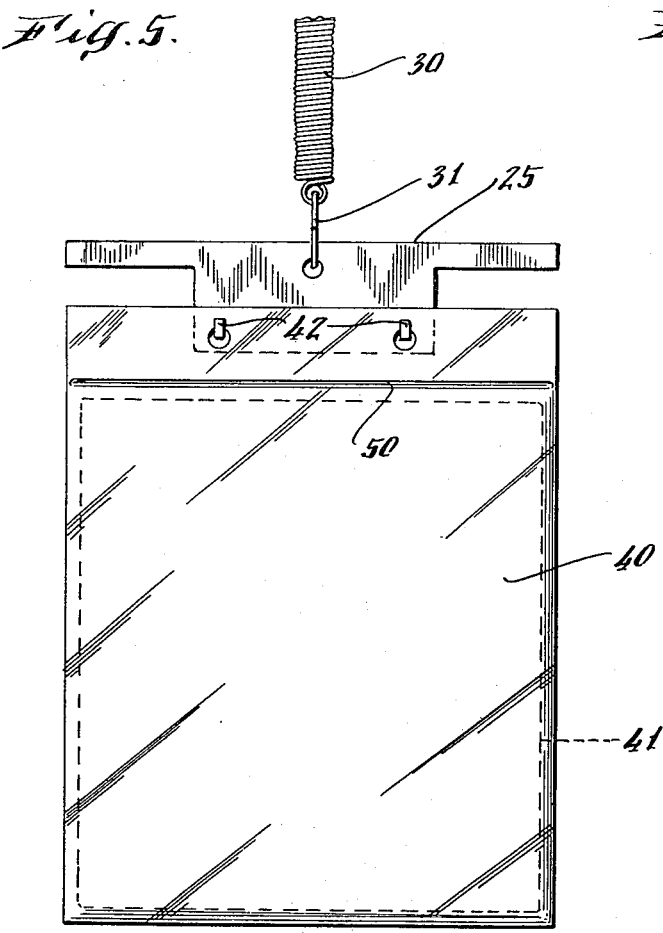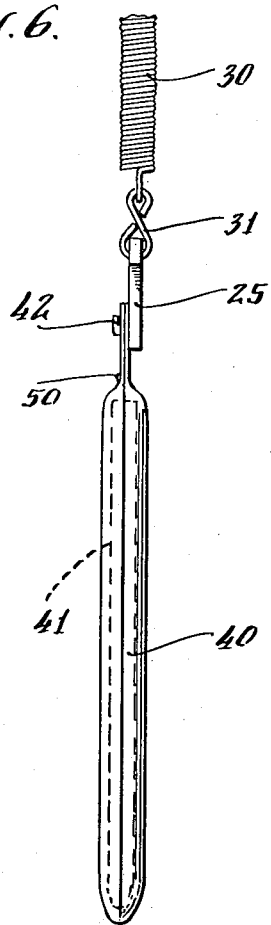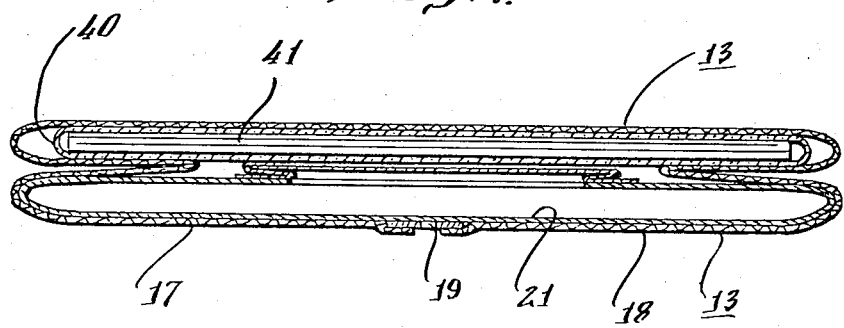

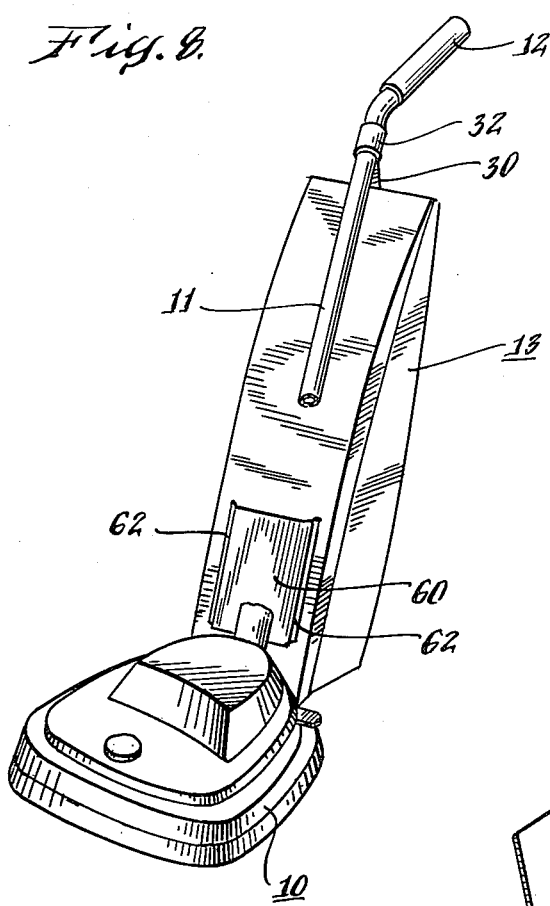
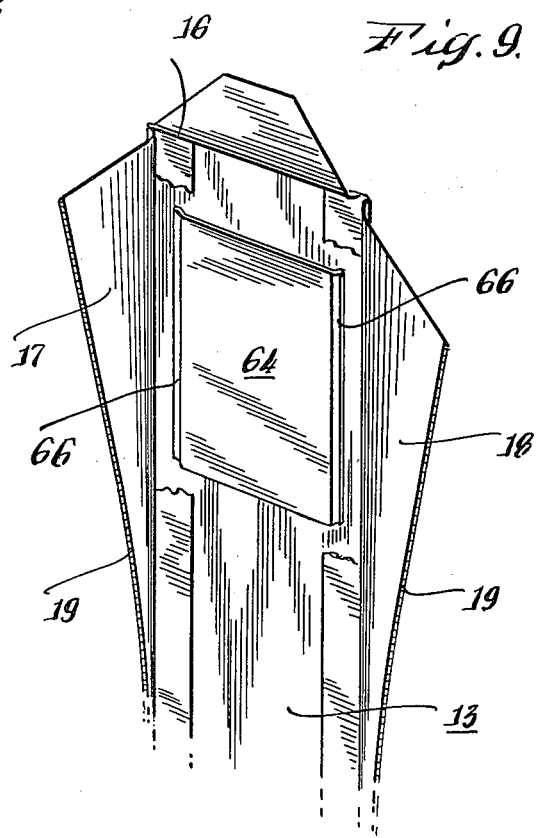

VACUUM CLEANER BAG ASSEMBLY

This is a division of application Ser. No. 857,094, filed Dec. 5, 1977.

BACKGROUND OF THE INVENTION

This invention relates to vacuum cleaners, and it is particularly directed to an arrangement for storing accessories on a vacuum cleaner assembly. While the invention is particularly adaptable for use in combination with "upright" vacuum cleaners of the domestic type, it will be apparent that the features of the invention are not so limited.

An "upright" vacuum cleaner, as defined herein, includes generally a low motor and brush assembly mounted on wheels and having an air outlet. A handle, such as a pole, is affixed, for example, by pivoting to the motor and brush assembly, to enable a user to propel the motor and brush assembly along a horizontal surface to be cleaned. A filter bag is removably held over the air outlet of the motor and brush assembly, the filter bag being generally supported within a container such as a flexible outer bag. The outer bag or container is frequently also supported from the handle, and this outer bag or container is generally porous and is also frequently ornamented for presenting a pleasing appearance.

This general type of structure is also frequently employed for hand-held vacuum cleaners, i.e. not depending upon wheels or a motor brush assembly, and it will, of course, be apparent that the invention is likewise adaptable to such appliances.

In use, it is necessary on occasion to remove the filter bag for disposal of waste picked up by the vacuum cleaner. The filter bags are thereby usually disposable. In order to enable replacement of the filter bags, the outer container or porous outer bag must be provided with a convenient closure, this closure, generally being in the form of an elongated zipper enabling access to the filter bag within the outer porous bag.

In a typical construction of this type, the porous outer bag is usually also removable from the vacuum cleaner assembly, being comprised of a hanger which may externally seal one end of the flexible outer bag, the hanger being held, for example, by a spring, hook or the like, from the handle of the vacuum cleaner assembly. The hanger thereby closes the end of the generally elongated flexible outer bag so that the zipper or other closure device employed permits substantially only side entry into the flexible porous outer bag for replacement of the filter bag. This type of closure structure renders somewhat difficult the replacement of the filter bag, since it frequently necessitates the "tucking" of the filter bag within the extreme regions of the flexible outer bag.

Needless to say, it is advisable in the use of vacuum cleaners of this type to have additional filter bags on hand. The structure of the vacuum cleaner itself, however, does not lend itself readily to storage of such bags.

The present invention is, therefore, directed to the provision of a vacuum cleaner assembly that overcomes the above problems.

Briefly stated, in accordance with the invention, the outer porous bag of a vacuum cleaner is formed with an end flap, as opposed to the completely sealed ends of conventional vacuum cleaners. The vacuum cleaner outer bag, in accordance with the invention, may then be designed with two side flaps extending generally from the region of the air outlet of the vacuum cleaner, the two side flaps overlapping the end flap and being held together at their edges by the elongated closure of the bag. With this arrangement, it is apparent that the entire end of the outer bag may be opened. Replacement of the inner filter bag is therefore greatly simplified.

In a particularly advantageous embodiment of the invention, the end flap of the outer bag is folded over a hanger, which in turn supports the free end of the bag, i.e. the end away from the air outlet of the vacuum cleaner. In this arrangement, the hanger may also be formed to support a storage pocket within the outer porous bag. The storage pocket may be releasably held to the hanger, for example, by means of hooks, within the outer porous bag, and the pocket is preferably of sufficient size to hold one or more spare filter bags. In order to minimize the space, the pocket on the hanger preferably extends downwardly behind the top of the filter bag in use.

In order that the invention will be more clearly understood, it will now be disclosed in greater detail with reference to the accompanying drawings, wherein:

FIG. 1 is a perspective view of an upright vacuum cleaner which may incorporate the present invention;

FIG. 2 is a rear view of the vacuum cleaner of FIG. 1;

FIG. 3 is an enlarged view of a portion of the vacuum cleaner of FIG. 2, with the outer bag partially opened;

FIG. 4 is a view corresponding to FIG. 3, with the outer bag fully opened to expose the storage bag therein:

FIG. 5 is a further enlarged frontal view of the hanger and storage pocket assembly shown in FIGS. 3 and 4;

FIG. 6 is a side view of the assembly of FIG. 5;

FIG. 7 is a still further enlarged cross-sectional view of the bag assembly for a vacuum cleaner in accordance with the invention;

FIG. 8 is a perspective view of an upright vacuum cleaner incorporating another embodiment of the present invention; and FIG. 9 is an enlarged view of the portion of the vacuum cleaner of FIG. 2 corresponding to FIG. 3, showing a further modification in accordance with the invention.

DESCRIPTION OF THE PREFERRED EMBODIMENT

Referring now to the drawings, and more in particular to FIGS. 1 and 2, therein is illustrated a vacuum cleaner in accordance with one embodiment of the invention. This form of vacuum cleaner is conventionally known as an "upright" vacuum cleaner, and the features of the invention, as will be hereinafter disclosed are of particular use in this form of vacuum cleaner. It will be apparent, however, that individual features or combinations of features of the invention are equally useful in other forms of vacuum cleaners.

The vacuum cleaner of FIGS. 1 and 2 is comprised of a motor and rotating brush generally denoted by the reference numeral 10. This unit may incorporate a motor for driving a pump, a rotating brush, and an air outlet at its rear end and adapted to be affixed to a suitable filter bag. In addition, the unit 10 may have wheels on its underside to facilitate its movement across a surface to be cleaned. Such units are completely conventional and do not form a portion of the invention per se. Therefore, a detailed disclosure of such units is not given here.

Further, in accordance with conventional practice, a handle may be provided for propelling the motor and brush unit across a floor. For this purpose, pole 11 or the like is hinged to the motor and brush unit and provided with a handle 12 at its upper end. The pole or rod 11 is of such length that an operator may employ the appliance while walking in an upright position. The structural details of the handle assembly are also completely conventional and require no further discussion here. The vacuum cleaner is further provided with a porous outer bag 13 suspended and held at the rear of the appliance. The porous outer bag 13, as in known vacuum cleaners, supports a filter bag affixed to the air outlet of the vacuum cleaner (shown in FIGS. 1 and 2), and hence the lower portion of the bag 13 surrounds and is sealed in conventional manner to the air outlet, for example, the bag 13 may at its lower end be provided with a fitting adapted to be clamped over the air outlet of the motor and brush assembly, the fitting of the bag 13 having a tube extending into the bag 13, so that a simple spring clip may be employed to connect the filter bag to receive air from the vacuum cleaner to be filtered. Any conventional form of coupling commonly employed on vacuum cleaners for this purpose may be provided here, since the invention is not directed particularly to this feature of a vacuum cleaner. Hence, details of such arrangements have been omitted from the present disclosure in order to avoid unnecessary disclosure of known elements. The lower end of the bag 13 of FIGS. 1 and 2 is thereby completely conventional in nature, as is the inner filter bag.

In accordance with one embodiment of the invention, the outer bag 13 is formed so that its upper end may be completely opened to thereby facilitate, for example, the replacement of a filter bag therein. For this purpose, as more fully illustrated in FIGS. 2-4, the outer bag 13 has an end flap 15, which may be folded downwardly to the bag along a generally transverse fold line 16. The flap 15 may be generally trapezoidal, as illustrated in the drawings, although this shape is not necessary as long as the flap 15 may be readily and firmly held within the bag 13 by the side flaps.

As further illustrated in FIGS. 2-4, the bag 13 has a pair of side flaps 17 and 18 on its rear side, the side flaps 17 and 18 extending from opposite sides of the bag so that they may be joined together at their inner edges by a suitable conventional closure, such as a zipper 19. The zipper 19 is of conventional nature and extends lengthwise of the bag 13, the slider 20 of the zipper (FIG. 2) being positioned to open the zipper as it is moved downwardly, i.e. away from the end flap 15.

Thus, as illustrated in FIG. 2, the zipper 19 may be fully closed to hold the end flap 15 within the bag, to form a neat appearance while retaining the filter bag in place. When the closure is opened as illustrated in FIG. 3, the top of the filter bag 21 is readily accessible and may be removed from the outer bag 13 with a minimum of effort. Of course, the closure may be opened to the lower end of the outer bag 13 as is conventionally the practice to facilitate the disconnection of the lower end of the filter bag. As above discussed, the filter bag 21 is of completely conventional construction comprising, for example, a porous paper medium adapted to entrap fine dust particles.

The top 22 of the filter bag 20 is of course sealed by conventional type means.

Further, in accordance with the invention, the upper end of the outer bag 13 is suspended by means of a hanger 25, as illustrated in FIGS. 3-6. The hanger 25, which may be comprised of a flat metal or plastic plate, extends generally transversely within the upper end of the bag 13, so that the end flap 15 is folded across the hanger 25 at the fold line 16. An aperture 26 is provided in the bag 13, centrally along the fold line 16, to permit a suitable hanging device such as a spring element 30 to pass therethrough. The lower end of the spring 30 is preferably loosely held to the hanger 25, for example, by means of an s-hook 31. The upper end of the spring 30 is adapted to be held to the pole 11 of the vacuum cleaner by conventional means, such as the connector 32 illustrated in FIGS. 1 and 2. The connector 32 may, if desired, be formed as a hook on the pole 11, in order to enable release of the spring 30 if it is desired to completely disassemble the bag assembly. The particular form of connection of the spring 30 to the pole 11, as well as to the hanger 25, is immaterial to the concept of the present invention, although it is desirable that a certain degree of flexibility be present in these interconnections. Similarly, the spring 30 may be replaced by a chain or other suitable suspending device, since this is likewise not a feature of the invention.

Since the hanger 25 extends transversely of the bag 13 under the flap 15, it is apparent that hanger 25 suspends the upper end of the bag 13 from the vacuum cleaner handle.

Still, further in accordance with the invention, a pocket 40 is provided on the hanger 25. The pocket 40 extends downwardly behind the filter bag 21 as illustrated in FIGS. 3 and 7, and is of sufficient size to contain one or more spare filter bags 41, as illustrated in FIGS. 4-6. In other words, in accordance with the invention, the pocket 40 may conveniently be suspended within the outer bag 13 to hold spare filter bags for replacement of the bag 21 in use, the spare bags 41 being held behind the bag 21 in use so as not to interfere with the placement process.

The pocket 40 may be formed as a unit with the hanger 25, for example, of a plastic material. Preferably, however, the pocket 40 is releasable from the hanger 25. For this purpose, the hanger 25 may be generally T-shaped, as illustrated more clearly in FIGS. 3-6 and be provided with hooks 42 adapted to be received by corresponding apertures in the bag 40. The hooks 42 are preferably positioned above the filter bag 21 in use, as illustrated in FIG. 3, to thereby avoid damage to the filter bag 21. With this construction it is apparent that the hooks may have small enough extensions that they do not increase the bulk of the structure beyond that demanded by the use of the filter bag 21.

The provision of a releasably held pocket 40, which itself may constitute a bag, also lends itself to marketing of spare filter bags since the pocket 40 may thus comprise a bag package of spare filter bags available for sale in stores. The pocket 40 may thus be in the form of a sealed marketing package which the user may merely hang from the hooks 42.

The outer bag 13 may be conventionally made of cloth, or a plastic material such as vinyl having small pinholes therethrough for the escape of air in the conventional manner. The bag 13 may, if desired, have external ornamentation. The storage pocket or pouch 40 may also be formed of a plastic material, such as vinyl. If desired, the pocket 40 may have a zip-lock closure, as indicated at reference numeral 50 in FIG. 5, in order to keep the contents of the pocket clean.

While the end flap of the outer bag 13 has been shown preferably as extending within the bag 13 to be held down by the side flaps 17 and 18, it will be apparent that other means may be employed either alternatively or in combination with this technique for the holding of the end flap in place. For example, conventional snappers may be provided on the end flap, for use either inside or outside of the side flaps, or Velcro fasteners may be employed for this purpose.

FIG. 8 discloses a modification of the invention wherein the outer bag is provided with a pocket 60 affixed to its outer surface, for example the lower outer surface thereof towards the handle of the vacuum cleaner. This pocket, which may be comprised of a sheet of plastic material heat sealed to the outer bag at its side and lower edges 62 as illustrated in FIG. 8, may be provided as an alternative to the pocket within the outer bag, as above discussed, or it may be employed in combination with the interior bracket.

In the still further embodiments of the invention illustrated in FIG. 9, an internal pocket 64 may be provided in the outer bag 13, for example, at the upper side thereof opposite the opening flaps. The pocket 64 may be comprised, for example, of a plastic material, such as the material of the outer bag 13, with its side and lower edges heat sealed to the material of the outer bag as indicated by the reference numeral 66.

While a single embodiment of the invention has been disclosed and described, it will thus be apparent that variations and modifications may be made therein, and it is intended in the following claims to cover each such variation and modification as falls within the true spirit and scope of the invention.

What is claimed:

1. In an elongated porous outer bag for a vacuum cleaner, said elongated porous outer bag having an elongated closure on one side thereof, said bag extending substantially vertically from an inlet at one end for receiving air the improvement wherein said bag has a pocket affixed to the material of the lower portion of said bag on the side thereof opposite said closure, said pocket comprising a sheet of material heat sealed to the material of said porous bag, the other end of said bag being open, a flap covering said open end and being affixed only to said opposite side and extending into the bag, said closure intersecting said open end.

2. In an elongated porous outer bag for a vacuum cleaner, said porous bag extending substantially vertically from an inlet at one end adapted to be fit to the air outlet of a vacuum cleaner, the improvement wherein said bag is open at the end thereof opposite said inlet, has a flap at said open end and affixed to only one side of the bag for covering said open end and has an elongated closure extending completely to said open end, said flap being being affixed to the side of said bag opposite said elongated closure and extending into the bag, said bag further having a pocket heat sealed thereto externally on the lower portion of side thereof opposite said elongated closure, said pocket extending across a substantially unapertured portion of the bag.

3. The elongated porous bag of claim 2 wherein said pocket comprises a sheet of plastic material having determined edges heat sealed to said elongated porous bag.

* * * * *